Sept. 11, 1951 M. NIEMI 2,567,393
COMBINED FISH PEW AND COUNTER
Filed April 26, 1947
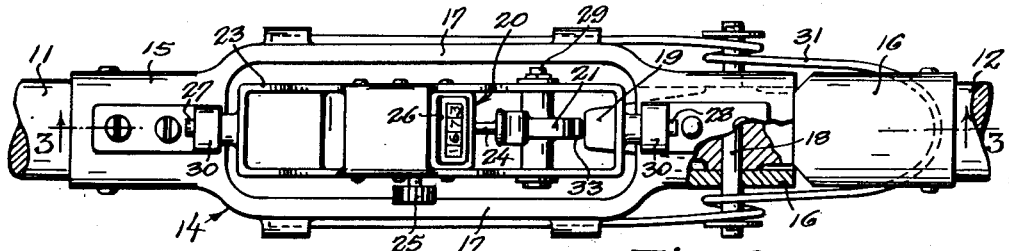
Fig. 2.
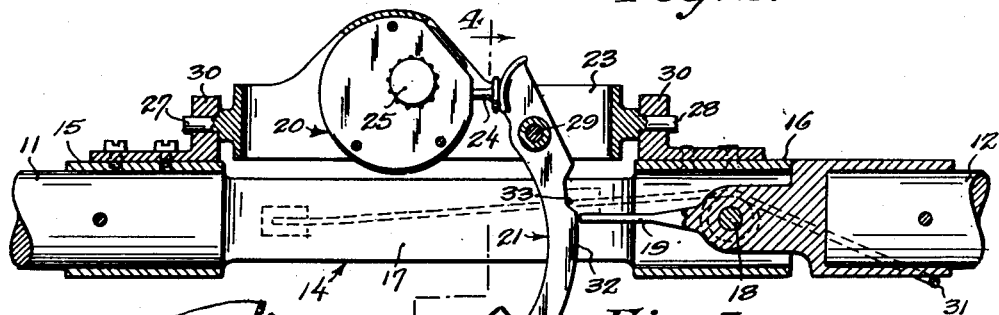
Fig. 3.
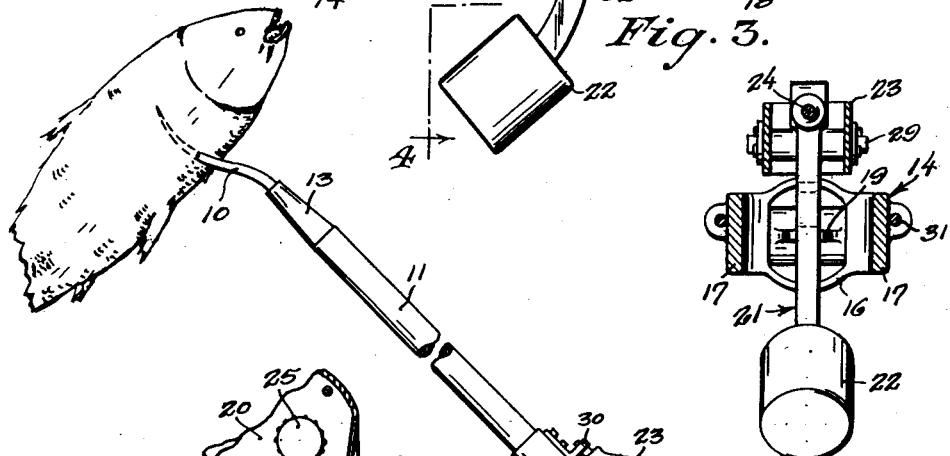
Fig. 4.
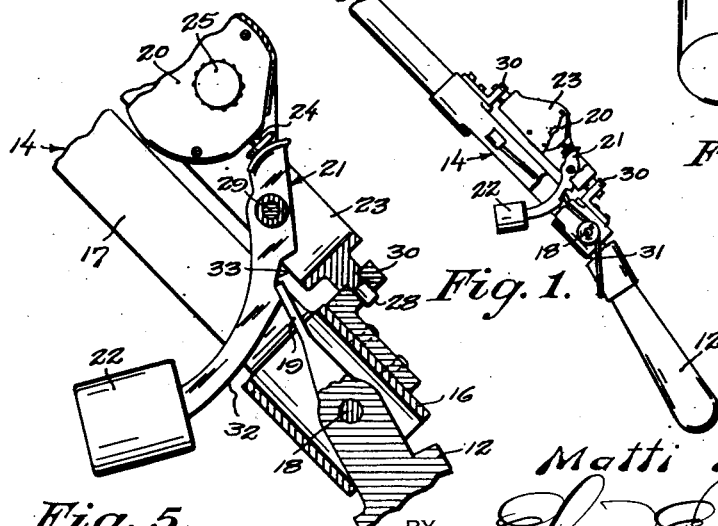
Fig. 1.
Fig. 5.
INVENTOR.
Matti Niemi
BY
ATTORNEYS.

Patented Sept. 11, 1951

2,567,393

UNITED STATES PATENT OFFICE 2,567,393

COMBINED FISH PEW AND COUNTER

Matti Niemi, Anchorage, Territory of Alaska

Application April 26, 1947, Serial No. 744,227

3 Claims. (Cl. 235—91)

This invention relates to a pitch-counting fish-pew, the term "pew" being commonly used by commercial fishermen to describe an instrument presenting a curved tine and which is employed for pitching fish from fishing vessels onto the receiving decks of canneries or from the vessels onto barges or the like which in turn carry the same to the cannery.

The object of the present invention is to devise an instrument of this nature embodying certain improvements over the pitch-counting fish-pew illustrated and described in my prior Letters Patent of the United States numbered 2,391,185, issued December 18, 1945.

In my said prior patent, a counter mechanism was embodied in the handle of the fish-pitching instrument, and for the actuation of this counter the instrument depended upon reciprocatory movement of the fish-impaling tine in a direction longitudinal to the axis, the arrangement being one in which the successive acts of first impaling the fish on the tine and then tossing the impaled fish onto a receiving deck served to complete a cyclic endwise reciprocation of the tine. It has been found that this endwise movement is, in some instances, rather disconcerting to the user and it is a particular object of the present invention to provide a fish-pew having a substantially rigid tine and incorporating therewith a counting mechanism which is made to operate automatically by normal movement of the pew incident to the pew's fish-pitching usage.

With the foregoing and other still more particular objects and advantages in view and which will appear and be understood in the course of the following detailed description and claims, the invention consists in the novel construction and in the adaptation and combination of parts hereinafter described and claimed.

In the accompanying drawing:

Figure 1 is a view principally in side elevation but partially broken away to represent a fish-pew constructed in accordance with the preferred teachings of the present invention, the tool being shown in the performance of a fish-pitching operation.

Fig. 2 is an enlarged fragmentary top plan view thereof with parts broken away and shown in section.

Fig. 3 is a longitudinal vertical sectional view on line 3—3 of Fig. 2.

Fig. 4 is a transverse vertical sectional view on line 4—4 of Fig. 3; and

Fig. 5 is a fragmentary longitudinal vertical sectional view taken substantially on the same section line as that of Fig. 3 but illustrating the parts in the positions which they assume when the front end of the instrument is raised, as in Fig. 1, to lift the impaled fish for transferring the same from a fishing boat to a receiving deck.

The fish-pew of the present invention provides a single sharply pointed and curved tine indicated by the numeral 10, and supporting this tine is a jointed handle comprised of front and rear sections 11 and 12, respectively. These handle sections normally lie in co-axial relation. The tine is or may be rigid with a metal ferrule 13 which is secured upon the forward end of the front handle section, and between and coupling the two sections together is a connector-fitting 14 which serves also as a frame to support the operating mechanism of the pew. Such fitting is desirably formed to present longitudinally spaced co-axial sockets 15 and 16 yoked together by laterally spaced cheek-bars 17. The front handle section is securely lodged in the front socket, while the rear handle section presents a terminal tongue extending into the rear socket for engagement therein with a transverse hinge pin 18. Projecting forwardly beyond the tongue articulation and into the opening described between the cheek-bars of the fitting is a finger prolongation 19.

The operating mechanism of my pew comprises a counter 20 and an activating lever 21 for this counter weighted as at 22, and as will be seen from an inspection of the drawing both the counter and the lever are supported from a hanger 23 which is formed to a generally rectangular loop form, top plan considered, and has the said counter securely caught in the forward end of the loop while the lever, indicated as being of the first order, lies to the rear thereof and is fulcrumed, as at 29, for swinging movement about a transverse axis. The counter is or may be of the usual construction providing a set of numbered wheels interconnected to perform the successive advance of the numbers of a higher order by a complete revolution of the wheel of the next lower order, and presenting a recoprically mounted operating stem 24 acting by depressive movement to cause the wheel of the lowest order to advance one count, returning to a normal inactive position by the opposing force of a light spring (not shown) contained within the counter. The counter is or may be provided with a knob 25 by means of which the wheels may be turned to a zero reading at the commencement of a counting operation, and there is provided a window, as 26, through which the count may be observed.

The hanger lies above and central to the frame 14 and there is presented fore and aft thereon trunnion pins 27—28, respectively, which find a rocker mounting in bearings 30 secured to the frame, thus allowing the counter-and-lever mechanism to maintain a plumb position within limits prescribed by the span between side rails of the frame.

When the two handle sections are in axial coincidence—and there is provided a spring 31 exerting a yielding influence upon the rear handle section to normally hold the two sections in this position—the form and mounting of the lever is such that the finger prolongation 19 of the rear handle section interrupts a free fore-and-aft swinging movement of the weighted arm of the lever 21 to preclude the lever's other arm from depressing the counter-activating stem, but there is provided in the rear face 32 of the lever a notch 33 into which the finger prolongation may enter when the latter is tilted upwardly by the act of crooking the rear section of the handle out of axial coincidence with the front section, and this said crooking is caused to occur in consequence of the ordinary employment of the pew, and which is to say, having first impaled a fish, by the act of then lifting the frontal end of the pew inherent to the normal swinging motion of tossing the impaled fish onto a receiving platform.

In use, the individual handling the fish-pew grasps the rear handle section with one hand, usually the right hand, and grips the front handle section with the other hand. Now, as the working end of the pew is employed to impale a fish, and the pew then swung in an upward arc to toss the impaled fish onto a receiving platform, the lever action necessarily exerted by the user, with the front hand serving much as a floating fulcrum while the direction in which force is applied to the rear section is downwards, relatively speaking, causes the two handle sections to "break" at the point of articulation and the resulting rise of the finger prolongation 19, coinciding with a gravity drop of the weighted end of the lever 21, allows this finger to clear the protruding shoulder of the weighted lever's rear face 32 and enter the notch 33, see Fig. 5. The greater degree, by comparison with the limited normal movement, to which the lever's activating arm is permitted to move forwardly imparts a counting movement to the operating stem 24 of the counter 20. As the impaled fish is thrown off the tine and the tine-end of the pew again lowered preparatory to impaling another fish, the spring 31 will assert itself to straighten the pew with a consequent return of the finger prolongation to the lever-interrupting position in which it is shown in Fig. 3. Under all conditions of normal handling, and which is to say in the absence of a fish's weight upon the tine, the two handle sections will lie in co-axial relation and hold the finger prolongation in its lever-interrupting position.

The described fish-pew and the manner of its operation will, it is believed, be clear from the foregoing. Various departures from the embodiment which I have here elected to illustrate may obviously be resorted to without departing from the spirit of the invention, and no limitations are to be implied by reason of having particularly described such illustrated embodiment. It is my intention that the hereto annexed claims be read with the broadest scope commensurate with the language used.

What I claim, is:

1. In an instrument providing a load-receiving head, the combination of a jointed handle therefor comprised of front and rear hinged sections arranged to be gripped one said section by one hand and the other said section by the other hand of the user, said sections being arranged to turn from a normal generally co-axial relationship through a limited degree of relative angular movement by the act of lifting the loaded instrument, a counting mechanism supported by the handle, normally inactive and oscillating means carried by one of said handle sections and acting at one end limit of its travel to cause the said counting mechanism to register a one-number rising count, and dog means carried by the other of said handle sections and caused to hold said oscillating means inactive when the handle sections are co-axial and to release said oscillating means when the handle sections are given relative movement by a loading of the handle.

2. In an instrument providing a load-receiving head, the combination of a jointed handle therefor comprised of front and rear hinged sections of which the front section is made integral with the load-receiving head and which said sections are arranged to be gripped one said section by one hand and the other said section by the other hand of the user, said sections being arranged to turn through a limited degree of relative angular movement from and into an approximate in-line relationship, a spring yieldingly resisting relative turning of the sections as a load is lifted by the instrument and serving normally to hold said sections at one limit of said relative angular movement, a counting mechanism supported by the handle, normally inactive means carried by the handle and movable into and out of a working position whereat it causes the said counting mechanism to register, means operating by the action of raising and lowering the head of the instrument incident to unloading and loading the head for respectively moving the said normally inactive means into and out of its said working position, and means for rendering said normally inactive means inactive when the load-receiving head is not loaded and for rendering said normally inactive means active when the said head is loaded.

3. In an instrument providing a load-receiving head, and having a jointed handle therefor comprised of a front section rigid with the head and a rear section hinged to the front section and with the two sections being arranged to be gripped one by one hand and the other by the other hand of the user, said sections being arranged to turn through a limited degree of relative angular movement from and into a normal approximately in-line relationship, a spring serving to hold the sections normally in their said in-line relationship, a counting mechanism supported by the front handle section, a lever supported by the front handle section and functioning by reciprocal swinging movement to operate the counting mechanism, a finger carried by the rear handle section for unitary movement therewith and operatively associated with the lever such that the finger interrupts the swinging movement of the lever when the two sections occupy their in-line relationship while being inactive to the lever when the sections are moved out of said in-line relationship, and means operating by the action of lowering and raising the head of the instrument, incident to loading and unloading the head, for imparting a swinging movement to the lever.

MATTI NIEMI.

REFERENCES CITED

The following references are of record in the file of this patent:

UNITED STATES PATENTS

| Number | Name | Date |
| --- | --- | --- |
| 379,106 | Durant | Mar. 6, 1888 |
| 1,232,960 | Myers | July 10, 1917 |
| 1,355,541 | De Camp | Oct. 12, 1920 |

FOREIGN PATENTS

| Number | Country | Date |
| --- | --- | --- |
| 397,549 | Germany | June 26, 1924 |